(12) United States Patent
Lin

(10) Patent No.: US 8,534,394 B2
(45) Date of Patent: Sep. 17, 2013

(54) POWER BRICK ASSEMBLY CAPABLE OF GENERATING A MECHANICAL ROTARY POWER OUTPUT USING SOLAR ENERGY

(76) Inventor: Wen-Pin Lin, Taichung (TW)

( * ) Notice: Subject to any disclaimer, the term of this patent is extended or adjusted under 35 U.S.C. 154(b) by 341 days.

(21) Appl. No.: 13/041,080

(22) Filed: Mar. 4, 2011

(65) Prior Publication Data

US 2012/0000503 A1    Jan. 5, 2012

(30) Foreign Application Priority Data

Jul. 1, 2010   (TW) ................................ 99121653 A

(51) Int. Cl.
*B60K 16/00*   (2006.01)

(52) U.S. Cl.
USPC .......... 180/2.2; 180/65.1; 180/65.31; 446/90; 446/91; 446/93; 446/95; 361/679.07

(58) Field of Classification Search
USPC ................ 180/2.2, 65.1, 65.21, 65.27, 65.29, 180/65.31, 14.1, 14.3; 361/679.07; 439/6, 439/8, 10; 446/90, 91, 93, 94, 95
See application file for complete search history.

(56) References Cited

U.S. PATENT DOCUMENTS

| | | | | |
|---|---|---|---|---|
| 4,731,030 A | * | 3/1988 | Johnston | 439/6 |
| 6,559,383 B1 | * | 5/2003 | Martin | 174/84 R |
| 6,923,277 B2 | * | 8/2005 | Lin | 180/2.2 |
| 6,942,489 B2 | * | 9/2005 | Tiesler | 439/34 |
| 7,094,059 B2 | * | 8/2006 | Obermeyer | 439/6 |
| 2006/0293095 A1 | * | 12/2006 | Takagi | 455/575.3 |
| 2010/0000804 A1 | * | 1/2010 | Yeh | 180/2.2 |

* cited by examiner

*Primary Examiner* — J. Allen Shriver, II
*Assistant Examiner* — Bryan Evans

(57) ABSTRACT

The power brick assembly includes a solar energy collecting plate carried on a carrier for collecting solar energy to generate electrical energy. A first connecting port is mounted on the carrier so that the carrier is movable relative to the first connecting port. A mechanical rotary power generating unit includes a second connecting port mounted on a brick-like casing and connected electrically and detachably to the first connecting port so that the first connecting port is movable relative to the second connecting port. The brick-like casing receives a battery module for supplying electric power, a driving module for generating a mechanical rotary power output in response to an electric power input, and a control module operable to output the electric power input based on one of the electrical energy from the solar energy collecting plate and the electric power from the battery module.

7 Claims, 12 Drawing Sheets

POWER BRICK ASSEMBLY CAPABLE OF GENERATING A MECHANICAL ROTARY POWER OUTPUT USING SOLAR ENERGY

CROSS-REFERENCE TO RELATED APPLICATION

This application claims priority of Taiwanese Application No. 099121653, filed on Jul. 1, 2010.

1. Field of the Invention

The invention relates to a power brick assembly, and more particularly to a power brick assembly having a solar energy collecting plate.

2. Description of the Related Art

FIG. 1 illustrates a conventional power brick assembly 900 combined with a power-driven wheel unit. The conventional power brick assembly 900 includes a solar energy collecting plate 91 mounted fixedly on a casing 92 for collecting solar energy to generate electrical energy, a driving module (not shown) disposed in the casing for generating a power output to drive the power-driven wheel unit using the electrical energy from the solar energy collecting plate 91. Because the solar energy collecting plate 91 cannot be adjusted to face a light source, solar energy cannot be effectively collected. In addition, when the conventional power brick assembly 900 is used in a dim environment, the solar energy collecting plate 91 cannot generate electric power sufficient to power the driving module. As a result, the conventional power brick assembly 900 cannot drive the power-driven wheel unit without supply of electric power to the driving module.

SUMMARY OF THE INVENTION

Therefore, an object of the present invention is to provide a power brick assembly capable of generating a mechanical rotary power output using solar energy that can overcome the aforesaid drawbacks of the prior art.

According to the present invention, a power brick assembly comprises:

a solar energy collecting unit including
  a solar energy collecting plate for collecting solar energy to generate electrical energy,
  a carrier for carrying the solar energy collecting plate thereon, and
  a first connecting port mounted on the carrier so that the carrier is movable relative to the first connecting port, the first connecting port being connected electrically to the solar energy collecting plate; and a mechanical rotary power generating unit including
  a brick-like casing,
  a second connecting port mounted on the brick-like casing, and connected electrically and detachably to the first connecting port so that the first connecting port is movable relative to the second connecting port,
  a battery module disposed in the brick-like casing for supplying electric power,
  a driving module disposed in the brick-like casing, and generating a mechanical rotary power output in response to an electric power input, and
  a control module disposed in the brick-like casing, and connected electrically to the second connecting port, the battery module and the driving module, said control module receiving the electrical energy from the solar energy collecting plate through the first and second connecting ports, and receiving the electric power from the battery module, the control module being operable to output the electric power input to the driving module based on one of the electrical energy and the electric power.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
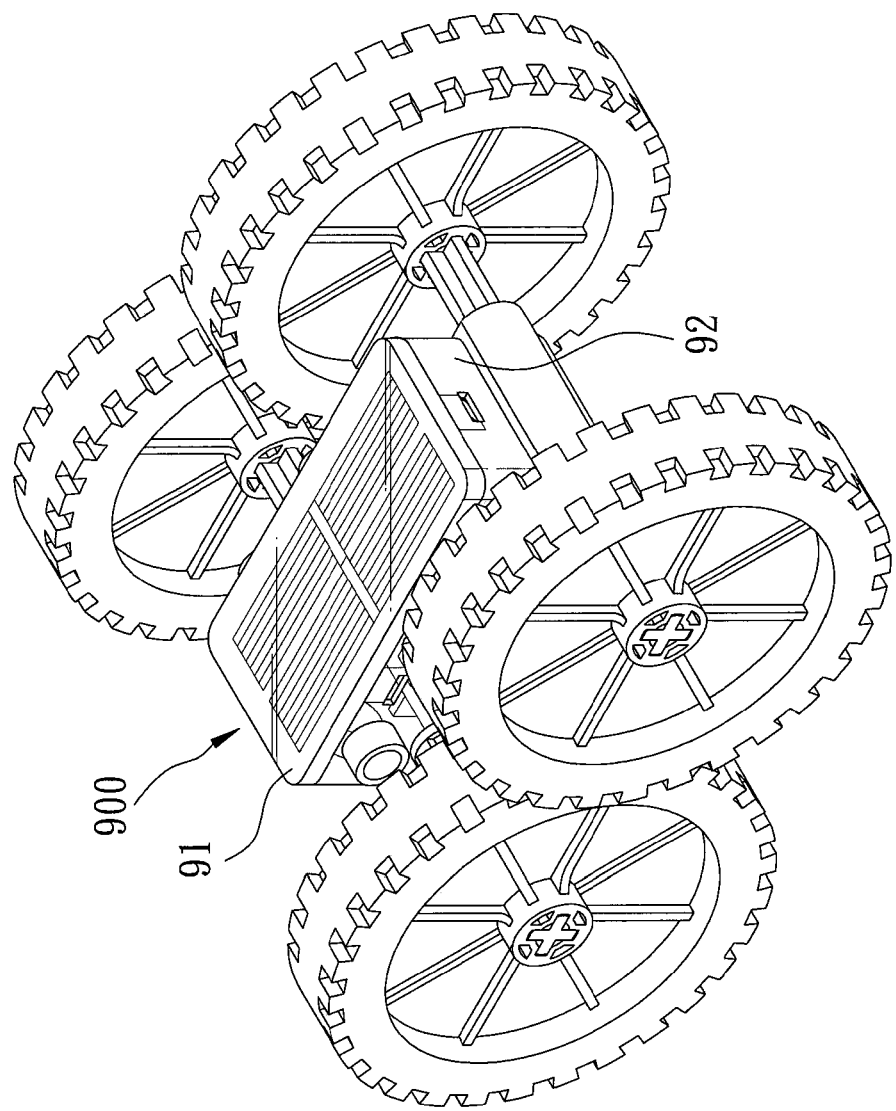
FIG. 1 is a perspective view of a conventional power brick assembly.
Figure 2:
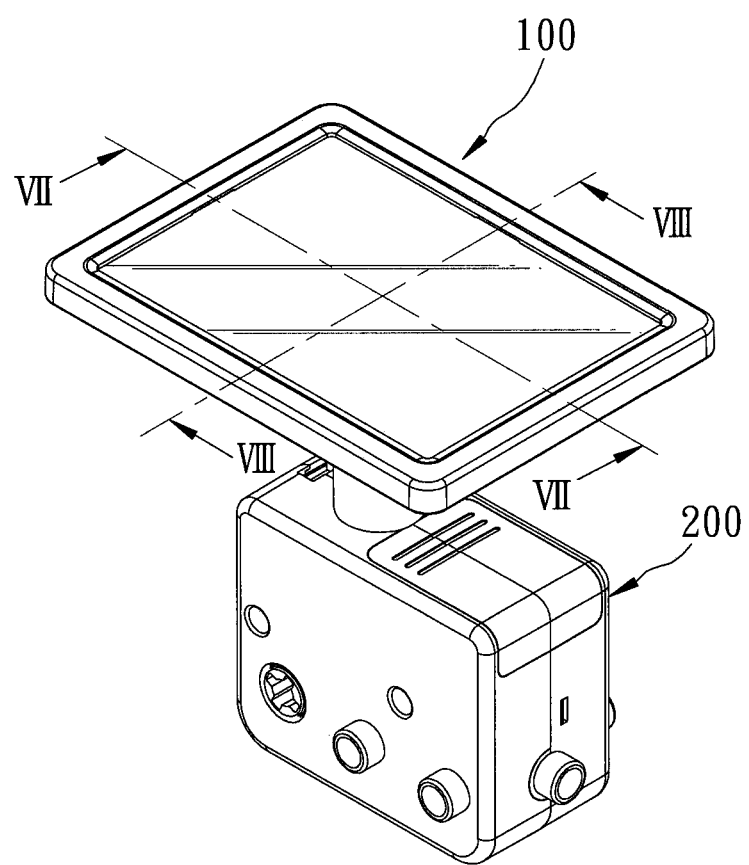
FIG. 2 is a perspective view showing the preferred embodiment of a power brick assembly according to the present invention.
Figure 3:
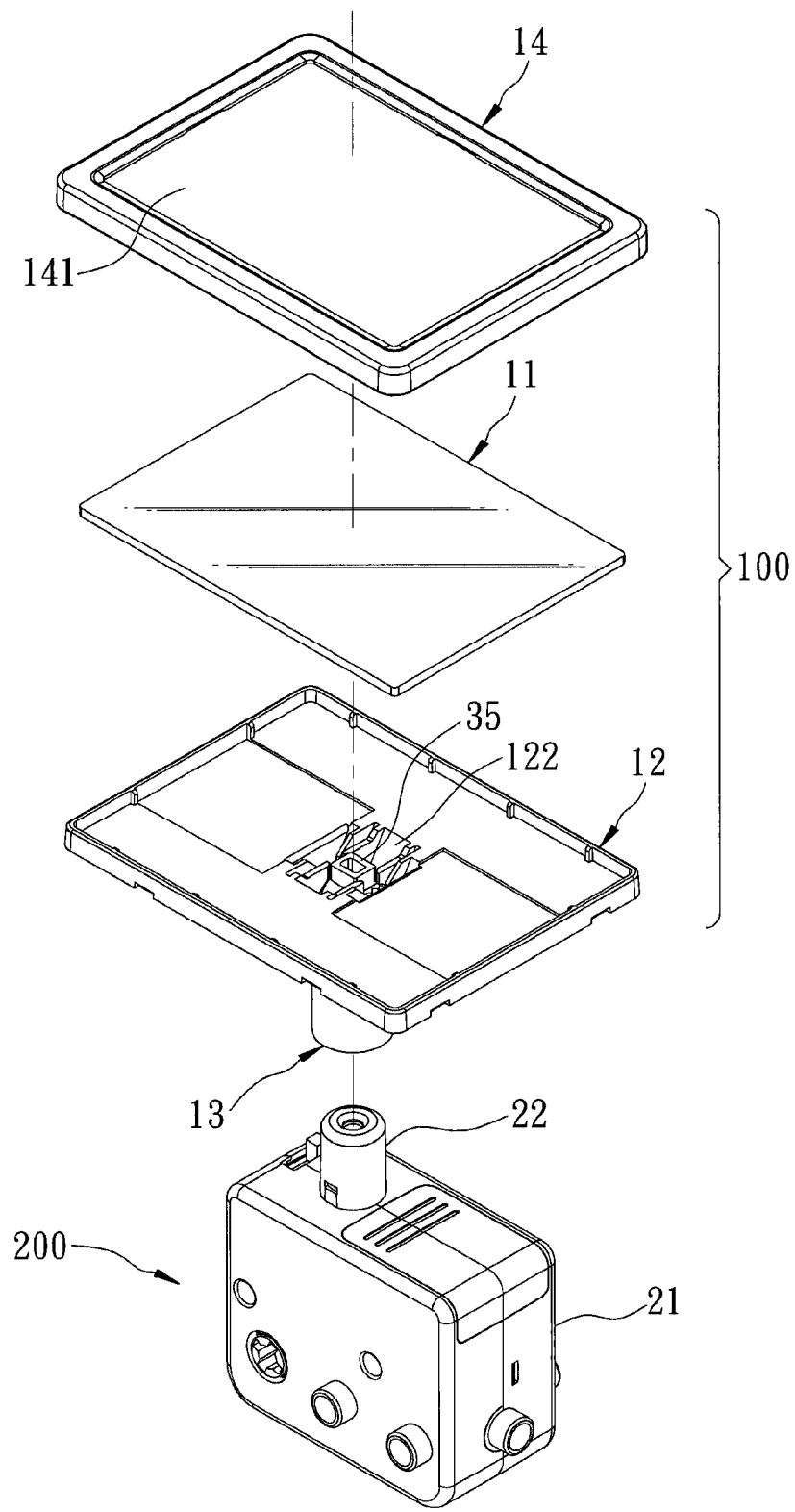
FIG. 3 is a partly exploded perspective view showing the preferred embodiment.

Referring to FIGS. 2 to 5, the preferred embodiment of a power brick assembly according to the present invention is shown to include a solar energy collecting unit 100, and a mechanical rotary power generating unit 200.

The solar energy collecting unit 100 includes a solar energy collecting plate 11, a carrier 12, a first connecting port 13, and a cap body 14.

The solar energy collecting plate 11 is carried on the carrier 11 for collecting solar energy to generate electrical energy. Preferably, the solar energy collecting plate 11 is capable of generating electrical energy of 4.5V.

The cap body 14 is mounted on the carrier 12, and has a transparent portion 141 disposed above the solar energy collecting plate 11.

Figure 6:
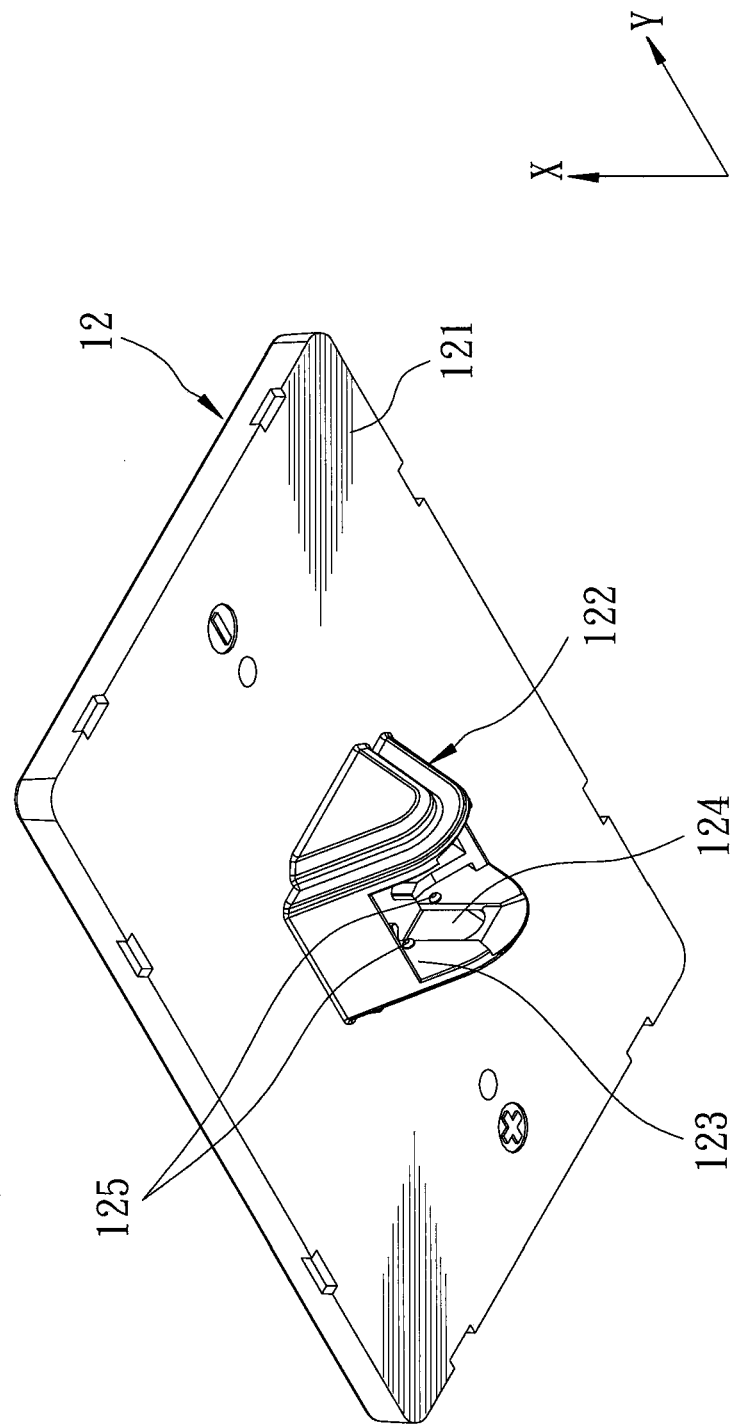
FIG. 6 is a perspective bottom view showing a carrier of the preferred embodiment.

Referring further to FIG. 6, the carrier 12 has a bottom side 121 formed with a center opening 120, and a mounting seat 122 extending outward and downward from the bottom side 121 and aligned with the center opening 120.

The first connecting port 13 is mounted on the carrier 12 so that the carrier 12 is movable relative to the first connecting port 13. The first connecting port 13 is connected electrically to the solar energy collecting plate 11. In this embodiment, the first connecting port 13 includes a sleeve body 131, a first terminal 132, and a pivot member 133. The sleeve body 131 extends in a first direction (X). The first terminal 132 extends along a first pivot axis (a1) parallel to the first direction (X), and is disposed in the sleeve body 121. The first terminal 132 is connected electrically to the solar energy collecting plate 11. The pivot member 133 is mounted on the sleeve body 131, and permits extension of the first terminal 132 therethrough. The pivot member 133 extends into and is connected pivotally to the mounting seat 122 of the carrier 12 such that the carrier 12 is rotatable relative to the pivot member 133 about a second pivot axis (a2) perpendicular to the first pivot axis (a1).

Figure 4:
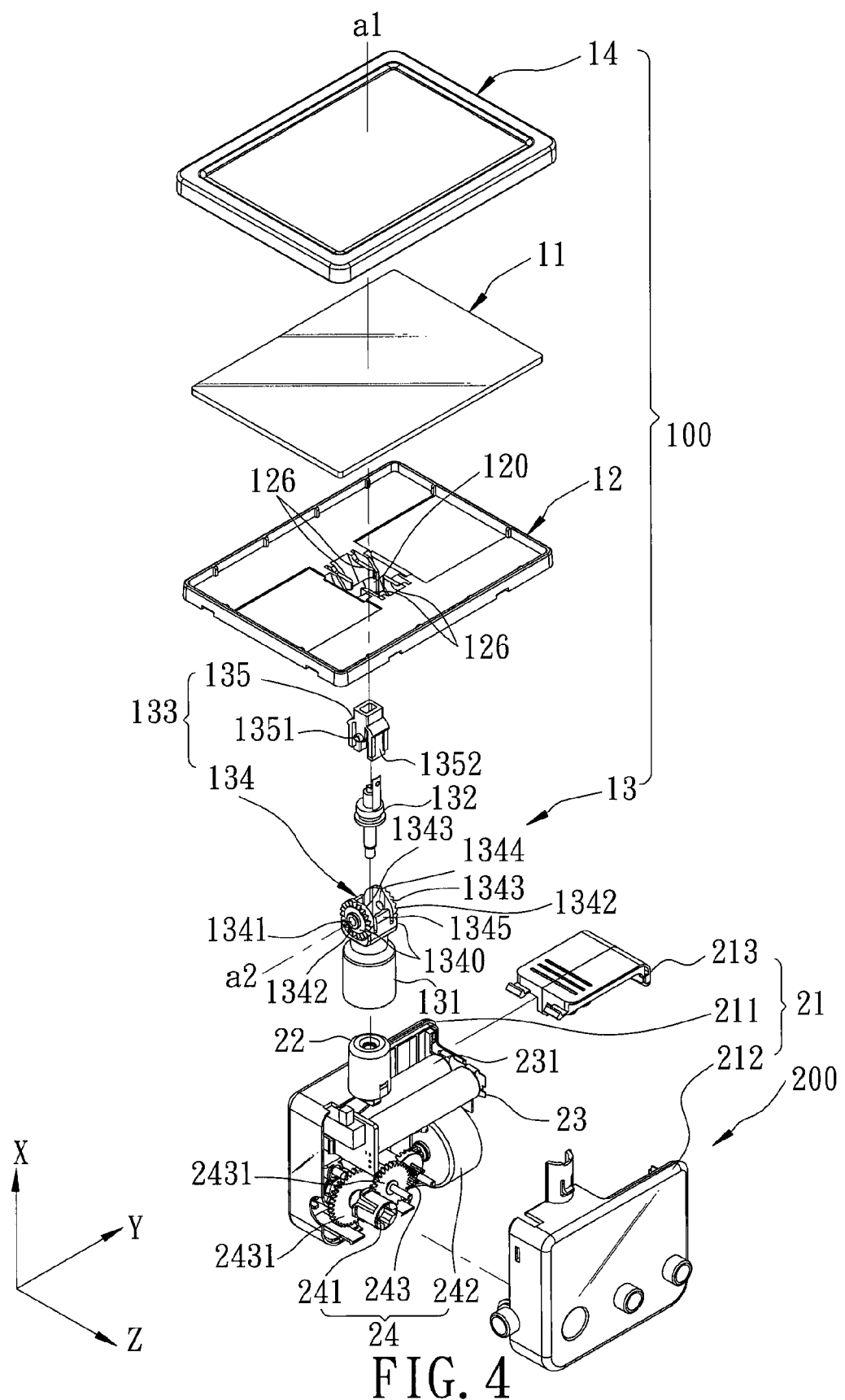
FIG. 4 is another partly exploded perspective view showing the preferred embodiment.
Figure 5:
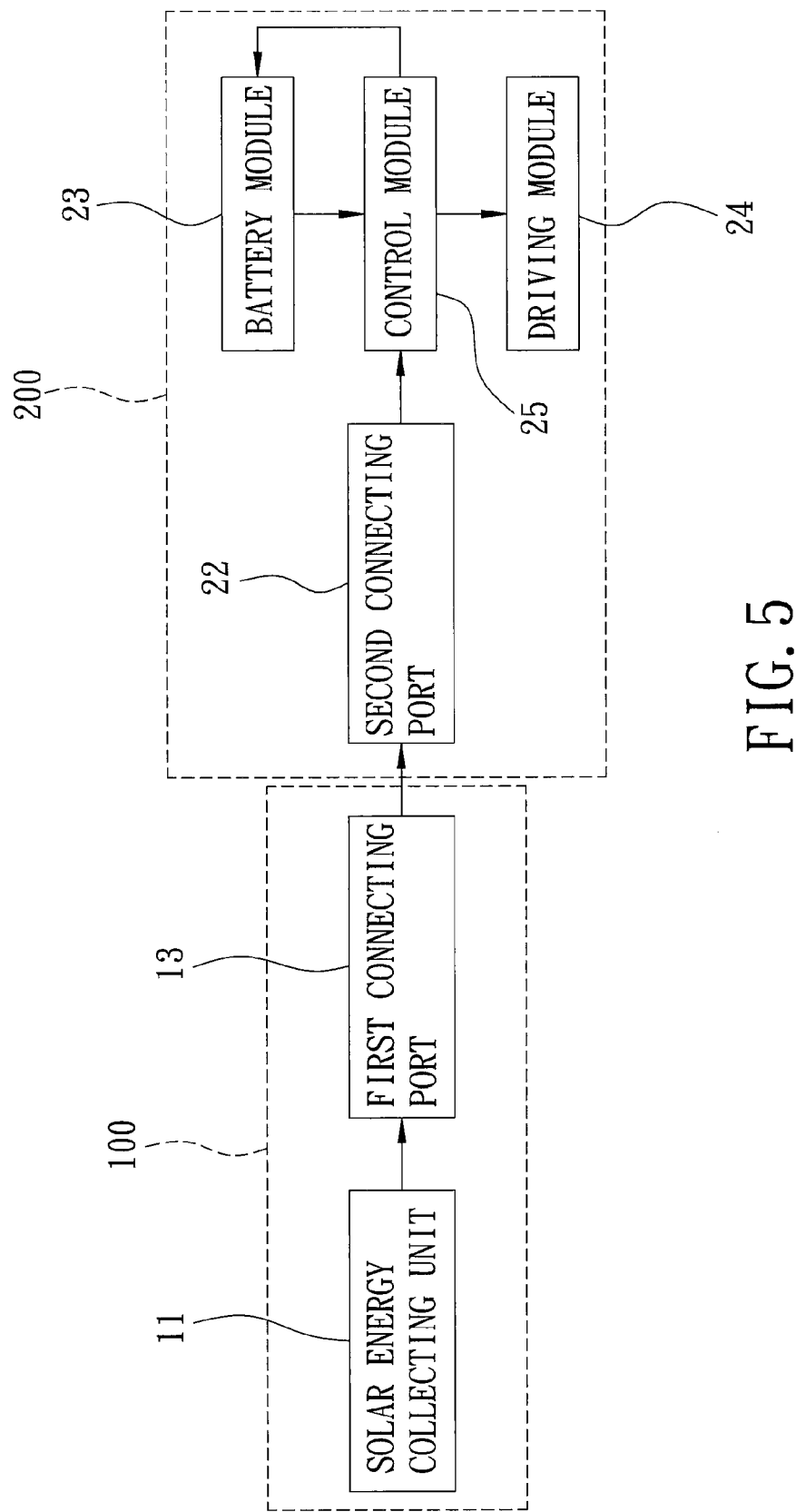
FIG. 5 is a schematic circuit block diagram illustrating the preferred embodiment.

In this embodiment, the mounting seat 122 of the carrier 12 has an inner surrounding surface 123 formed with two mounting grooves 124 that are opposite to each other in a second direction (Y) perpendicular to the first direction (X) (see FIG. 7), and two pairs of positioning protrusions 125 projecting from the inner surrounding surface 123 toward each other. The positioning protrusions 125 of each pair are disposed adjacent to a corresponding mounting groove 124 (see FIG. 6). The mounting seat 122 further has two pairs of plate bodies 126 spaced apart from each other in the second direction (Y), as shown in FIG. 4. Each pair of the plate bodies 126 extend in a third direction (Z) perpendicular to the second directions (Y) from the inner surrounding surface 123 toward each other. Each plate body 126 has an inclined lower abutting end 1261 (see FIG. 10).

Figure 7:
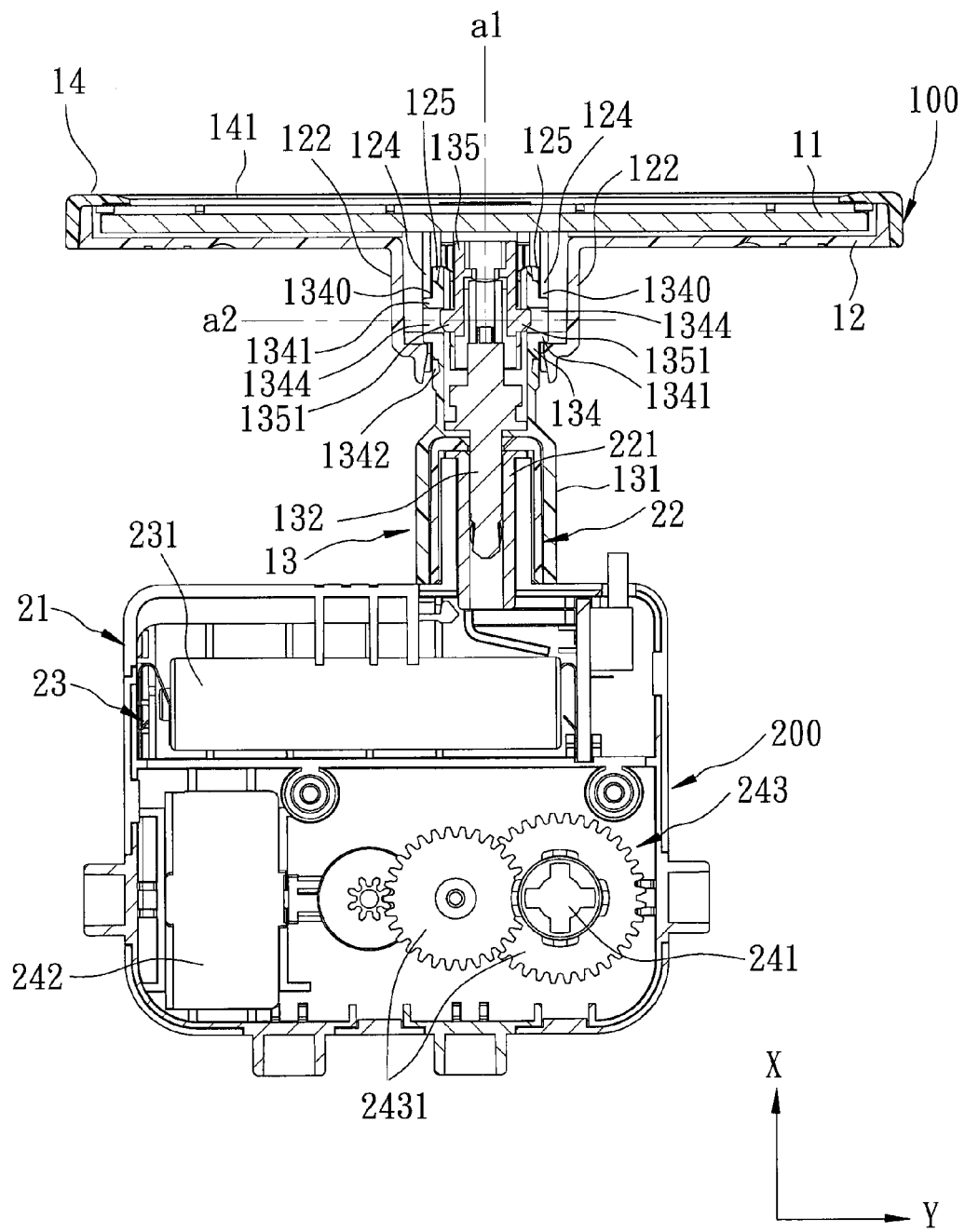
FIG. 7 is a schematic sectional view of the preferred embodiment taken along line VII-VII in FIG. 2.
Figure 8:
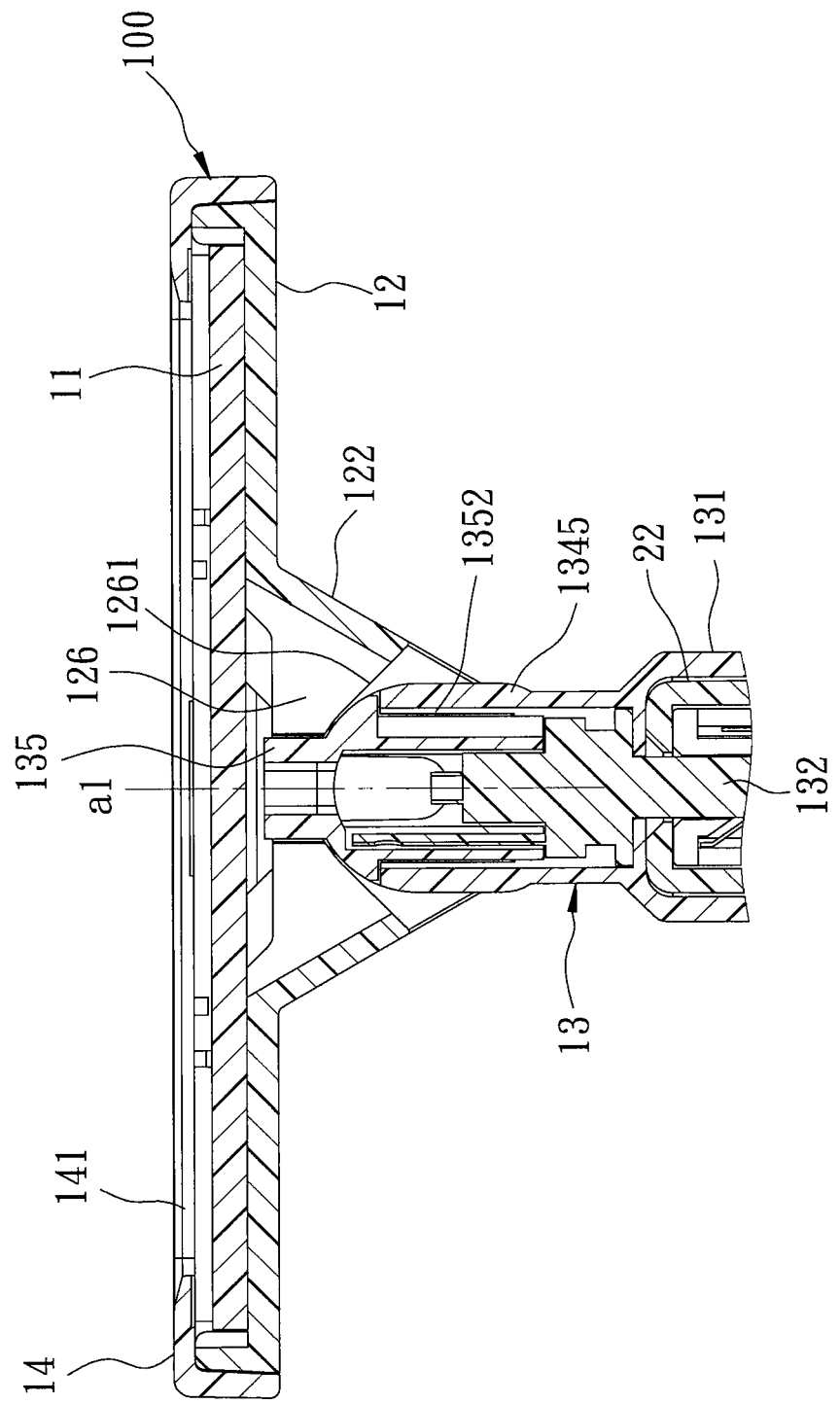
FIG. 8 is a fragmentary schematic sectional view of the preferred embodiment taken along line VIII-VIII in FIG. 2.
Figure 9:
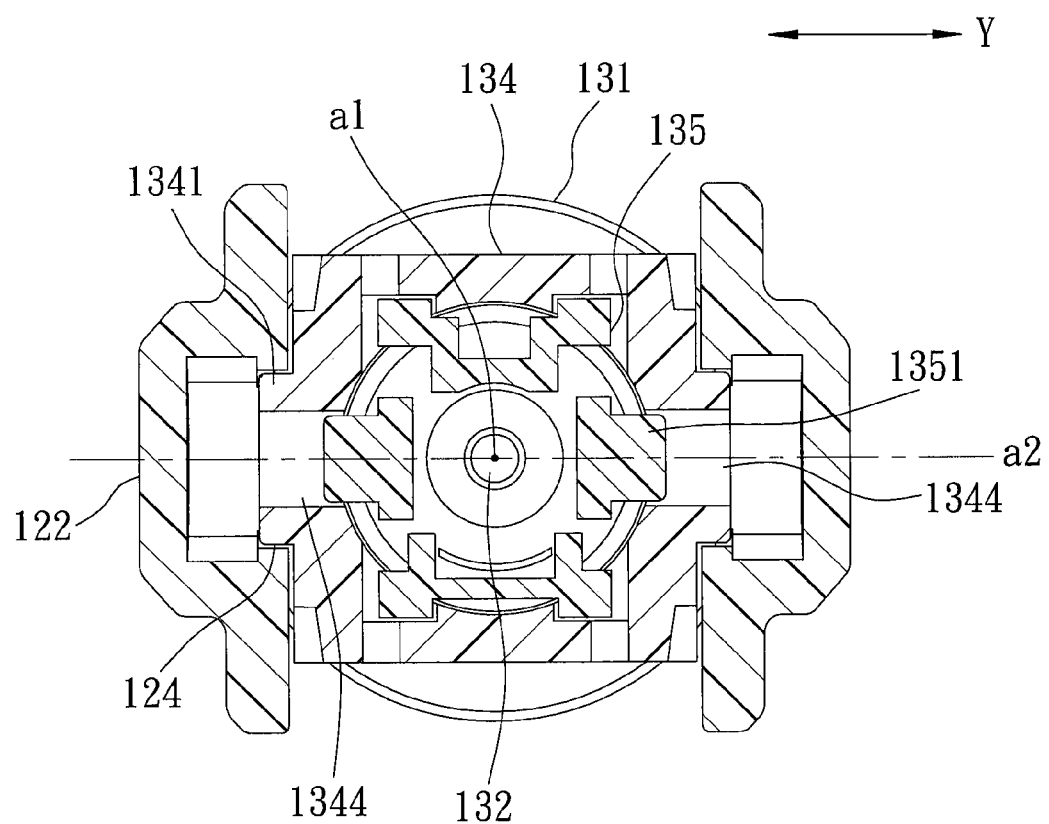
FIG. 9 is a schematic sectional view illustrating the relationship between a carrier and a first connecting port of the preferred embodiment.
Figure 10:
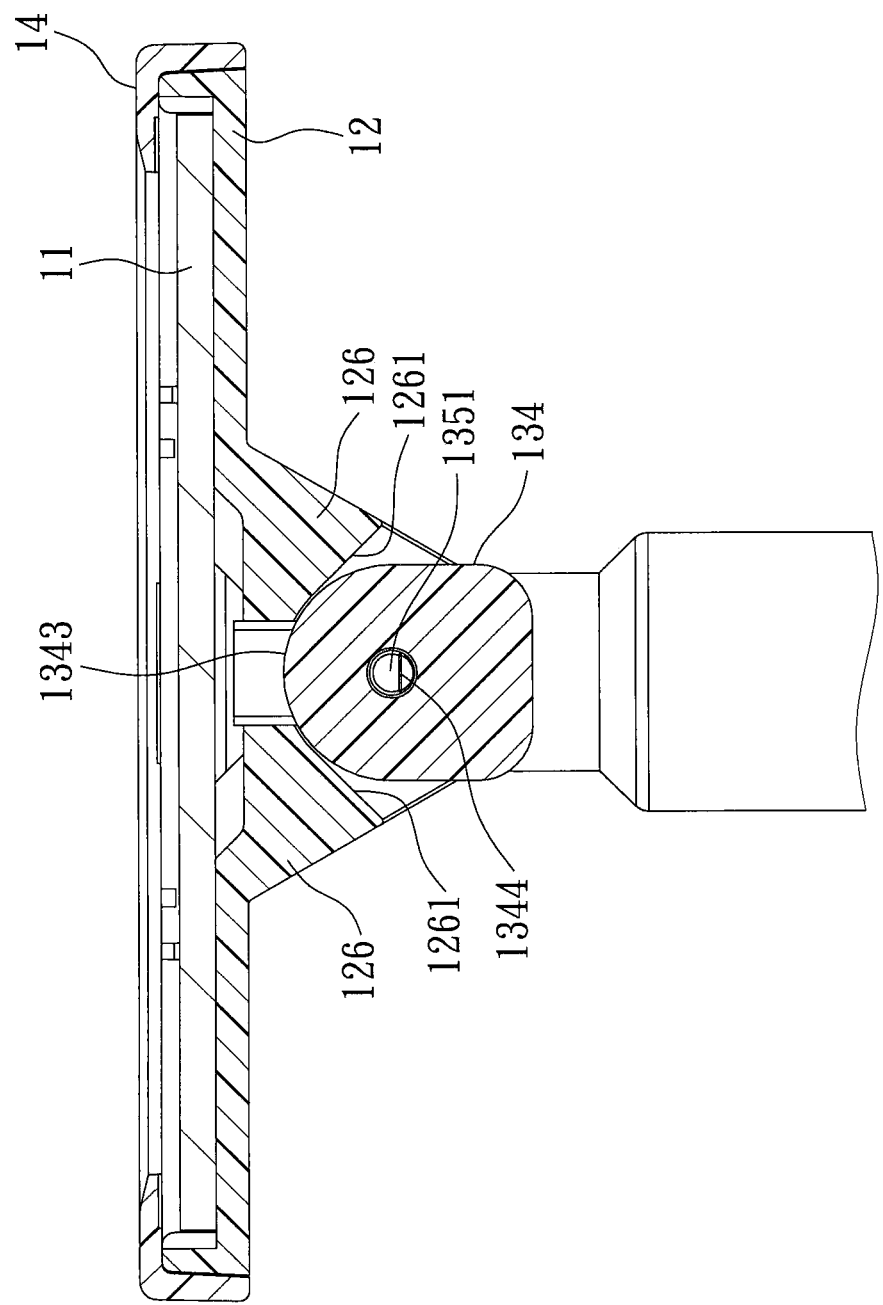
FIG. 10 is a fragmentary, partially schematic sectional view illustrating the relationship between the carrier and a pivot member of the first connecting port of the preferred embodiment.

In this embodiment, the pivot member 133 includes a connecting seat 134 and an inserting block 135. The connecting seat 135 is connected integrally to the sleeve body 131. The connecting seat 135 has two outer side surfaces 1340 opposite to each other in the second direction (Y), and two curved supporting faces 1343 spaced apart from each other in the second direction (Y). Each outer side surface 1340 is formed with a pivot post 1341, and a plurality of engaging grooves 1342 arranged around the pivot post 1341. The pivot posts 1341 of the connecting seat 134 are aligned with the second pivot axis (a2), and engage rotatably and respectively the mounting grooves 124 in the mounting seat 122 of the carrier 12 (see FIGS. 7 and 9) such that the carrier 12 is rotatable relative to the connecting seat 134 about the second pivot axis (a2), as best shown in FIG. 7. Each pair of the positioning protrusions 125 engage releasably and respectively two corresponding ones of the engaging grooves 1342 in a corresponding outer side surface 1340 of the connecting seat 134 such that the carrier is positioned to a desired position. The inclined lower abutting ends 1251 of each pair of the plate bodies 126 of the mounting seat 122 abut against a corresponding curved supporting face 1343 of the connecting seat 134, as shown in FIG. 10. In addition, the connecting seat 134 is further formed with two connecting holes 1344 aligned with the second pivot axis (a2), as best shown in FIGS. 7 and 9, and further has two positioning ribs 1345 extending in the first direction (X) toward the carrier 12 and spaced apart from each other. The inserting block 135 is inserted into the connecting seat 134, and permits extension of the first terminal 132 therethrough. The inserting block 135 has two outward extending connecting rods 1351 that are opposite to each other in the second direction (Y), and that engage respectively the connecting hole 1344 in the connecting seat 134, as shown in FIGS. 7 and 9. The inserting block 135 further has opposite side surfaces each formed with a positioning groove 1352 that engages a corresponding positioning rib 1345 of the connecting seat 134, thereby positioning the inserting block 135 in the connecting seat 134, as shown in FIG. 8.

The mechanical rotary power generating unit 200 includes a brick-like casing 21, a second connecting port 22, a battery module 23, a driving module 24, and a control module 25.

The brick-like casing 21 consists of three casing parts 211, 212, 213, wherein the casing part 213 is in the form of a battery cap.

The second connecting port 22 is mounted on the brick-like casing 21, and connected electrically and detachably to the first connecting port 13 so that the first connecting port 13 is movable relative to the second connecting port 22. In this embodiment, when the solar energy collecting unit 100 is connected to the second connecting port 22, the sleeve body 131 of the first connecting port 13 is sleeved on the second connecting port 22 such that the sleeve body 131 of the first connecting port 13 is rotatable relative to the second connecting port 22 about the first axis (a1). Since the carrier 12 is connected to the sleeve body 131 through the pivot member 133, the carrier 12 is rotatable relative to the second connecting port 22 about the first pivot axis (a1). The second connecting port 22 has a second terminal 221 that contacts electrically the first terminal 132 of the first connecting port 13 when the solar energy collecting unit 100 is connected to the second connecting port 22.

The battery module 23 is disposed in the brick-like casing 21 for supplying electric power. In this embodiment, the battery module 23 includes a rechargeable battery set consisting of two rechargeable batteries 231 connected in series. In this embodiment, each rechargeable battery is capable of supplying electric power of 1.5V.

The driving module 24 is disposed in the brick-like casing 21, and generates a mechanical rotary power output in response to an electric power input, such as a voltage input of 3V. In this embodiment, the driving module 24 includes a drive shaft 241, a motor 242, and a transmission unit 243. The driving shaft 241 is mounted on the brick-like casing 21. The motor 242 is connected electrically to and is controlled by the control module 25 to generate a rotary output in response to the electric power input. The transmission unit 243 is coupled between the motor 242 and the drive shaft 241 for receiving the rotary output from the motor 242. The transmitting unit 243 transfers the rotary output received thereby into the mechanical rotary power output, and transmits the mechanical rotary power output to the drive shaft 241 such that the drive shaft 241 outputs the mechanical rotary power output corresponding to a rotational speed. The transmitting unit 243 includes a plurality of transmission gear 2431 meshing with each other.

The control module 25 is disposed in the brick-like casing 21, and is connected electrically to the second connecting port 22, the battery module 23 and the motor 242 of the driving module 24. The control module 25 is operable to output the electric power input to the motor 242 of the driving module 24 based on one of the electrical energy and the electric power. The control module 25 is further operable to charge the rechargeable batteries 231 of the battery module 23 with the electrical energy from the solar energy collecting plate 11.

Usually, the solar energy collecting unit 100 can supply electrical power for activating the driving module 24 and charging the rechargeable batteries 231. However, when the power brick assembly is used in a dim environment or when the solar energy collecting unit 100 is detached from the second connecting port 22, the battery module 23 supplies electrical power for powering the driving module 24.

Figure 11:
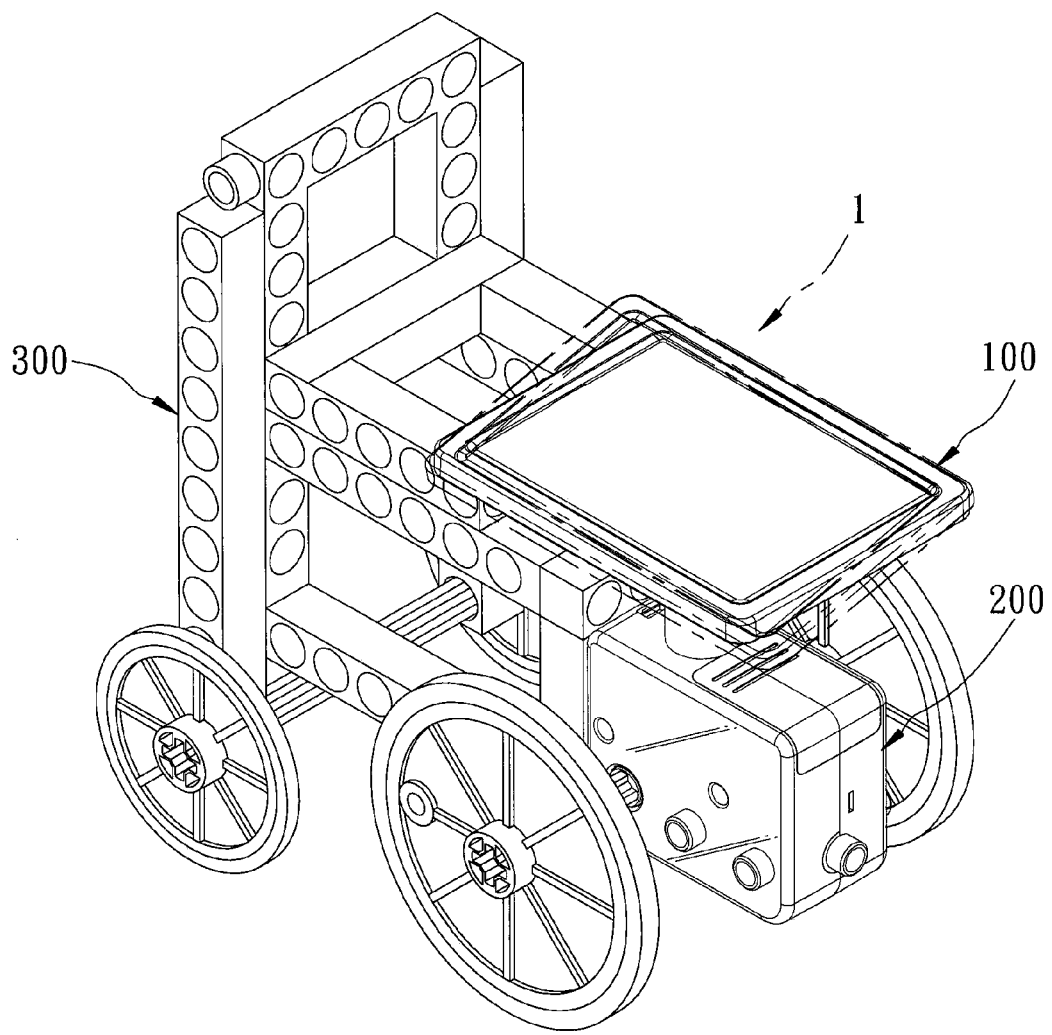
FIGS. 11 and 12 are perspective views showing the preferred embodiment combined with a toy assembly.
Figure 12:
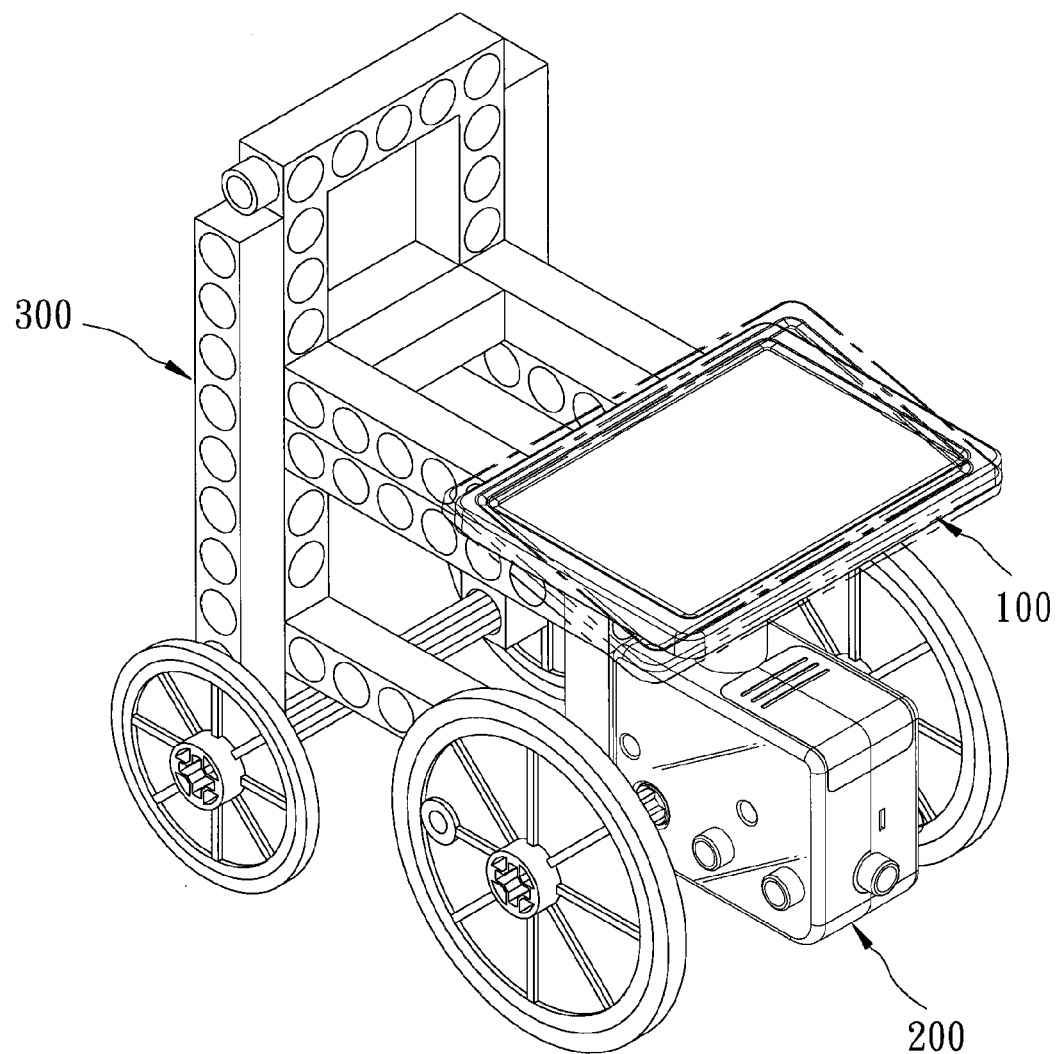

The power brick assembly of the present invention serves as a mechanical power source, and can be combined with a toy assembly 300, such as a Lego-style toy car shown in FIGS. 11 and 12, to drive movement of the toy assembly 300.

The following are some of the advantages attributed to the power brick assembly of the present invention:

1. The carrier 12 can be adjusted so that the solar energy collecting plate 11 faces a light source. Therefore, the solar energy collecting plate 11 can effectively collect solar energy, thereby enhancing electric generation efficiency.

2. Due to the presence of the battery module 23, the power brick assembly can output mechanical rotary power output even in a dim environment, thereby providing improved functionality.

3. Since the rechargeable batteries 231 can be charged by the control module 25 before supplying electric power to the driving module 24, frequent replacement of the batteries 231 is not required.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A power brick assembly comprising:
   a solar energy collecting unit including
      a solar energy collecting plate for collecting solar energy to generate electrical energy,
      a carrier for carrying said solar energy collecting plate thereon, and
      a first connecting port mounted on said carrier so that said carrier is movable relative to said first connecting port, said first connecting port being connected electrically to said solar energy collecting plate; and
   a mechanical rotary power generating unit including
      a brick-like casing,
      a second connecting port mounted on said brick-like casing, and connected electrically and detachably to said first connecting port so that said first connecting port is movable relative to said second connecting port,
      a battery module disposed in said brick-like casing for supplying electric power,
      a driving module disposed in said brick-like casing, and generating a mechanical rotary power output in response to an electric power input, and
   a control module disposed in said brick-like casing, and connected electrically to said second connecting port, said battery module and said driving module, said control module receiving the electrical energy from said solar energy collecting plate through said first and second connecting ports, and receiving the electric power from said battery module, said control module being operable to output the electric power input to said driving module based on one of the electrical energy and the electric power;
   wherein said carrier has a bottom side, and a mounting seat extending outward from said bottom side;
   wherein said first connecting port includes
      a sleeve body extending in a first direction, and sleeved movably and detachably on said second connecting port such that said sleeve body is rotatable relative to said second connecting port about a first pivot axis parallel to the first direction,
      a first terminal extending along the first pivot axis, and disposed in said sleeve body, said first terminal being connected electrically to said solar energy collecting plate, and to said second connecting port when said sleeve body is sleeved on said second connecting port, and
      a pivot member mounted on said sleeved body, and permitting extension of said first terminal therethrough, said pivot member extending into and being connected pivotally to said mounting seat of said carrier such that said carrier is rotatable relative to said pivot member about a second pivot axis perpendicular to the first pivot axis;
   wherein said pivot member of said first connecting port has two outer side surfaces opposite to each other in a second direction perpendicular to the first direction, each of said outer side surfaces being formed with a pivot post, and a plurality of engaging grooves arranged around said pivot post, said pivot posts of said pivot member being aligned with the second pivot axis; and
   wherein said mounting seat of said carrier has an inner surrounding surface formed with two mounting grooves that are opposite to each other in the second direction, and two positioning protrusions projecting from said inner surrounding surface toward each other and disposed respectively adjacent to said mounting grooves, said pivot posts of said pivot member engaging rotatably and respectively said mounting grooves in said mounting seat of said carrier such that said carrier is rotatable relative to said pivot member about the second pivot axis, each of said positioning protrusions engaging releasably a corresponding one of said engaging grooves in a corresponding one of said outer side surfaces of said pivot member such that said carrier is positioned to a desired position.

2. The power brick assembly as claimed in claim 1, wherein:
   said battery module includes a rechargeable battery set; and
   said control module is operable to charge said rechargeable battery set with the electrical energy from said solar energy collecting plate.

3. The power brick assembly as claimed in claim 1, wherein said driving module includes:
   a drive shaft mounted on said brick-like casing;
   a motor connected electrically to and controlled by said control module to generate a rotary output in response to the electric power input from said control module; and
   a transmission unit coupled between said motor and said drive shaft for receiving the rotary output from said motor, said transmission unit transferring the rotary output received thereby into the mechanical rotary power output, and transmitting the mechanical rotary power output to said drive shaft such that said drive shaft outputs the mechanical rotary power output.

4. The power brick assembly as claimed in claim 3, wherein said transmission unit includes a plurality of transmission gears meshing with each other.

5. The power brick assembly as claimed in claim 1, wherein:
   said pivot member of said first connecting port has two curved supporting faces spaced apart from each other in the second direction; and
   said mounting seat further has two pairs of plate bodies spaced apart from each other in the second direction, each pair of said plate bodies extending in a third direction perpendicular to the second direction from said inner surrounding surface toward each other, each of said plate bodies of each pair having an inclined lower abutting end that abuts movably against a corresponding one of said curved supporting faces of said pivot member.

6. The power brick assembly as claimed in claim 5, wherein said pivot member of said first connecting port includes:
   a connecting seat connected to said sleeve body, said connecting seat having said outer side surfaces, said pivot posts, said engaging grooves and said curved supporting faces, said connecting seat being formed with two connecting holes aligned with the second pivot axis; and an inserting block inserted into said connecting seat and permitting extension of said first terminal therethrough, said inserting block having two outward extending connecting rods that are opposite to each other in the second direction, and that engage respectively said connecting holes in said connecting seat.

7. The power brick assembly as claimed in claim 6, wherein:

said connecting seat of said pivot member further has a positioning rib extending in the first direction toward said carrier; and said inserting block of said pivot member has a side surface formed with a positioning groove that engages said positioning rib, thereby positioning said inserting block in said connecting seat.

\* \* \* \* \*